(12) United States Patent
Krishnamurthy

(10) Patent No.: US 7,810,445 B2
(45) Date of Patent: Oct. 12, 2010

(54) MOVING GRADUATION LIGHTING ACCENT FROM POINTER

(75) Inventor: Jagadeesh Krishnamurthy, Troy, MI (US)

(73) Assignee: DENSO International America, Inc., Southfield, MI (US)

( * ) Notice: Subject to any disclaimer, the term of this patent is extended or adjusted under 35 U.S.C. 154(b) by 103 days.

(21) Appl. No.: 12/237,458

(22) Filed: Sep. 25, 2008

(65) Prior Publication Data

US 2010/0071611 A1    Mar. 25, 2010

(51) Int. Cl.
*G01D 11/28* (2006.01)
*G01D 13/22* (2006.01)

(52) U.S. Cl. .................. 116/288; 116/286; 116/301; 116/329; 116/DIG. 6; 116/DIG. 36; 362/23; 362/29

(58) Field of Classification Search .......... 116/284, 116/286–288, 293, 300, 301, 327–329, 332, 116/DIG. 5, DIG. 6, DIG. 36; 362/23, 26–30
See application file for complete search history.

(56) References Cited

U.S. PATENT DOCUMENTS

| | | | | |
|---|---|---|---|---|
| 2,286,737 A | * | 6/1942 | Hills | 116/62.3 |
| 4,380,043 A | * | 4/1983 | Takamatsu et al. | 362/26 |
| 5,631,448 A | * | 5/1997 | Rabinowitz et al. | 177/177 |
| 5,697,322 A | * | 12/1997 | Hay et al. | 116/286 |
| 5,878,689 A | * | 3/1999 | Sugita | 116/286 |
| 6,561,123 B2 | * | 5/2003 | Kallinke et al. | 116/288 |
| 6,827,034 B1 | * | 12/2004 | Paulo | 116/286 |
| 6,854,416 B2 | * | 2/2005 | Breinich et al. | 116/202 |
| 7,178,479 B1 | * | 2/2007 | Richter | 116/288 |
| 7,305,932 B2 | * | 12/2007 | Hildebrand et al. | 116/301 |
| 7,506,607 B2 | * | 3/2009 | Takato | 116/301 |

FOREIGN PATENT DOCUMENTS

DE    102006046405 A1 *  1/2008
JP        2009014623 A  *  1/2009

* cited by examiner

*Primary Examiner*—Amy Cohen Johnson
(74) *Attorney, Agent, or Firm*—Harness, Dickey & Pierce, P.L.C.

(57) ABSTRACT

A gauge may employ a dial plate, a pointer shaft driven by a motor, a printed circuit board having a plurality of light sources, such as LEDs, and a motor. An upper pointer may be located on a viewed side of the dial plate and a lower pointer may be located on an unviewed side of the dial plate. The upper and lower pointers are attached to the pointer shaft. The lower pointer is positioned to receive light from the light source and direct the light into indicia and graduations of the dial plate, and into the upper pointer. An area surrounding the upper pointer is more brightly lit than other areas of the dial plate. A light-collecting ring may collect light and transmit light into the lower pointer. The ring may be an integral or attached part of the lower pointer or it may be a detached and separate piece.

20 Claims, 4 Drawing Sheets

MOVING GRADUATION LIGHTING ACCENT FROM POINTER

FIELD

The present disclosure relates to lighting of a vehicle gauge or instrument.

BACKGROUND

The statements in this section merely provide background information related to the present disclosure and may not constitute prior art. Vehicle gauges are known to be lighted and have proven satisfactory for their given purposes; however, such gauges are not without their share of limitations. Limitations may consist of gauges that light in only a single color or light, pointers that illuminate in the same color of light as surrounding lighted gauge portions, and gauges that are not highlighted vis-à-vis the area immediately surrounding the pointer.

In recognition of such limitations, initiatives are being taken in the gauge industry to improve upon or change gauge lighting to make such lighted gauges easier to see by using different colors, to ensure that gauges may be read more quickly upon viewing, and to reduce strain on the eyes of drivers, which predominantly occurs during non-daylight, or darkness hours. What is needed then is a gauge that directs light to a pointer and surrounding numerical indicia and graduations to make the gauge easier to see by using different colors, a gauge with a pointer that is noted by different colors, and a gauge that reduces strain on the eyes of a driver.

SUMMARY

A gauge may employ a dial plate or face plate through which a pointer shaft passes. An upper pointer may be attached to the pointer shaft and be resident on a viewed side of the dial plate while a lower pointer may be attached to the pointer shaft and be resident on a non-viewed side of the dial plate. A light source, such as an LED, may emit light that is received by the lower pointer. The lower pointer may emit the light which is received by the upper pointer. Because the upper and lower pointers may be arranged in line, or one in front of the other, the upper pointer and the indicia and graduations adjacent the upper pointer may appear brighter than the other indicia and graduations of the dial plate.

A light receiver may be positioned above the light source and receive light and transfer or pass the light into the lower pointer. The light receiver may form a ninety degree angle with the lower pointer to receive light from the light source most efficiently, or to receive as much light from the light source as possible. To transfer as much light as possible to the upper pointer, the lower pointer may extend to at least the same length as the upper pointer so that the full length of the upper pointer may receive light. The lower pointer may employ one or more light carrying prongs, which may be separated by a gap. The light prongs may further broaden the lit area on the dial plate viewed by a viewer. The upper pointer may be positioned directly above (in line with) the lower pointer with respect to a viewer's line of sight. The lower pointer may employ a light receiving and transmitting ring for receiving and transmitting light into the lower pointer. The ring may be attached or part of the lower pointer or it may be attached to the printed circuit board. Depending upon how wide or large the illuminated area surrounding the upper pointer is desired to be, the lower pointer may be the same width or wider than the upper pointer. Generally, the wider the lower pointer, the larger the halo effect of light to be seen by a viewer viewing the indicia and graduations of the dial plate.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
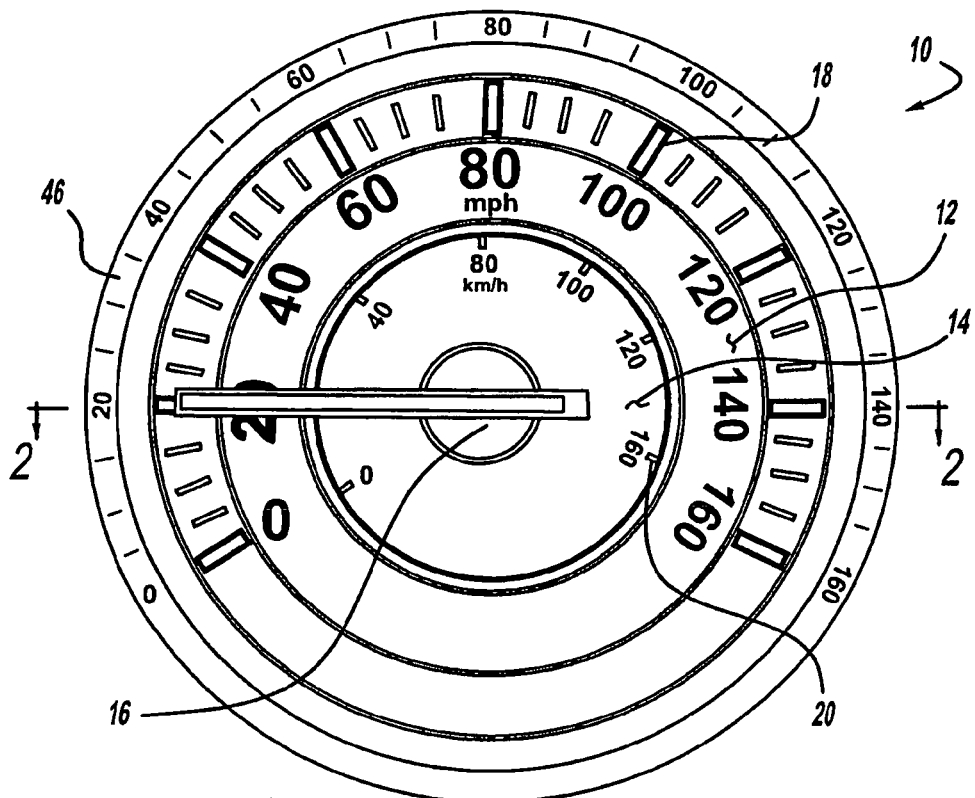
FIG. 1 is a front view of a gauge according to the teachings.

The following description is merely exemplary in nature and is not intended to limit the present disclosure, application, or uses. Throughout the drawings, corresponding reference numerals indicate like or corresponding parts and features. Turning now to FIGS. 1-8, details of the teachings of the present disclosure will be presented.

A gauge 10, such as a speedometer, in accordance with the present teachings, generally includes a first or main dial 12 and a second or auxiliary dial 14 that is viewed in conjunction with a first pointer 16, also called an upper or main pointer. The first or main dial 12 is a progressive scale such as miles per hour ("MPH") while the second of auxiliary dial 14 is also a progressive scale such as kilometers per hour ("km/h"). The main indicia of the main scale 12 denote increments in MPH while the auxiliary indicia of the auxiliary scale 14 denote increments in km/h. As the pointer 16 rotates either clockwise or counter clockwise about the gauge 10, the pointer 16 points to corresponding MPH indicia and km/h indicia.

Figure 2:
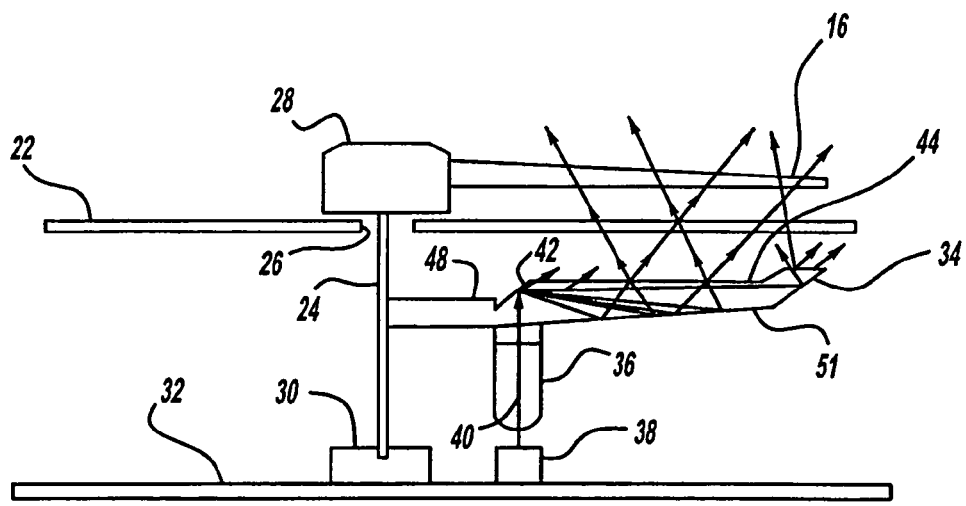
FIG. 2 is a side view of an embodiment of the gauge of FIG. 1.

FIG. 2 depicts a first embodiment of the invention which employs, in addition to that discussed above, a dial plate 22 upon which the main scale 12, auxiliary scale 14, main indicia and auxiliary indicia are resident or situated. The upper pointer 16 is attached to a shaft 24 that passes through a hole 26 in the dial plate 22. A hub 28 provides a junction point between the pointer 16 and the shaft 24 and also covers the hole 26 such that any space between the dial plate 22 and the shaft 24 can not be seen by a viewer of the dial plate 22. The shaft 24 is driven or turned by an electric motor 30 that may be mounted to a printed circuit board 32 ("PCB").

Figure 3:
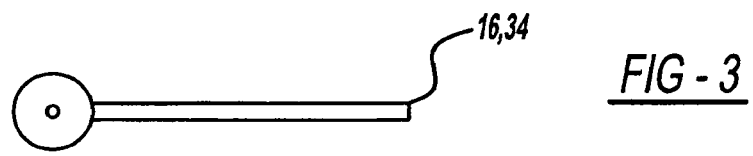
FIG. 3 is a top view of pointers according to the teachings.

Continuing with FIG. 2, a lower pointer 34 may be attached to the shaft 24 and rotate under the upper pointer 16. More specifically, the upper pointer 16 and lower pointer 34 may rotate in a coincident fashion, such as with the upper pointer 16 directly over the lower pointer 34. In such a fashion, as depicted in a top view in FIG. 3, the upper pointer 16 and lower pointer 34 may be considered coincident, such as when each pointer 16, 34 have equal widths. The lower pointer of FIG. 2 contains a prism 36 which serves as a component to receive or pick up light from a light source 38, such as a light emitting diode ("LED"). Light sources, such as the LED 38, may be arranged in a circular manner about the The effect of the embodiments depicted in FIGS. 2 and 3 is depicted in FIG. 1. More specifically, the as the pointers 16, 34 rotate in accordance with the rotation of the shaft 24, light from the LED 38, for example, is transmitted into the prism 36 extending from the pointer 34. In the side view of FIG. 2, the prism 36 extends downward and away from the main body of the pointer 34, and toward the LED 38. As light is received into the prism 36, it is further transmitted into the lower pointer 34 where it is able to travel throughout the lower pointer 34 and illuminate the lower pointer 34. As an example, light beam 40 may be transmitted from the LED 38 and into the lower pointer 34 where it can them be reflected off of wall 42 and along the interior length of the lower pointer 34.

Continuing with FIG. 2, when light is transmitted along the interior length of the lower pointer 34, the light may be reflected out of the top surface 44 so that the light 40 can be transmitted to the upper pointer 16 as depicted in FIG. 2. When the light is transmitted along the interior length of the lower pointer 34, out of the top surface 44 of the lower pointer 34 and into and through the upper pointer 16, the upper pointer 16 will be more greatly illuminated than the surrounding first dial 12, main graduations 18, second dial 14, and auxiliary graduations 20. However, the first dial 12, main graduations 18, second dial 14, and auxiliary graduations 20 directly under the upper pointer 16, will also be more greatly illuminated because of the light being emitted from the lower pointer 34. The advantage of such a structure is that when a driver looks to the gauge 10, he or she will immediately see a more brightly illuminated first dial 12, main graduations 18, second dial 14, and auxiliary graduations 20, and the accompanying more brightly illuminated pointer 16. This will permit a viewer, such as a driver, to not only know exactly where to look on the gauge because the upper pointer 16 and surrounding area 46 will be more brightly illuminated than the balance of the dial, but even before the driver actually, directly looks at the gauge 10, he or she may know exactly where to look to see the pointer 16 because the pointer 16 and surrounding area 46 will be slightly more illuminated and thus, stand out as a more brightly lit area to a driver. In order to prevent an area from being illuminated, such as the periphery about the hub 28, the top surface 48 may be masked with a material that prevents the passage of light. Similarly, a reflective material may be installed on the bottom surface 51 of the pointer 34.

Figure 4:
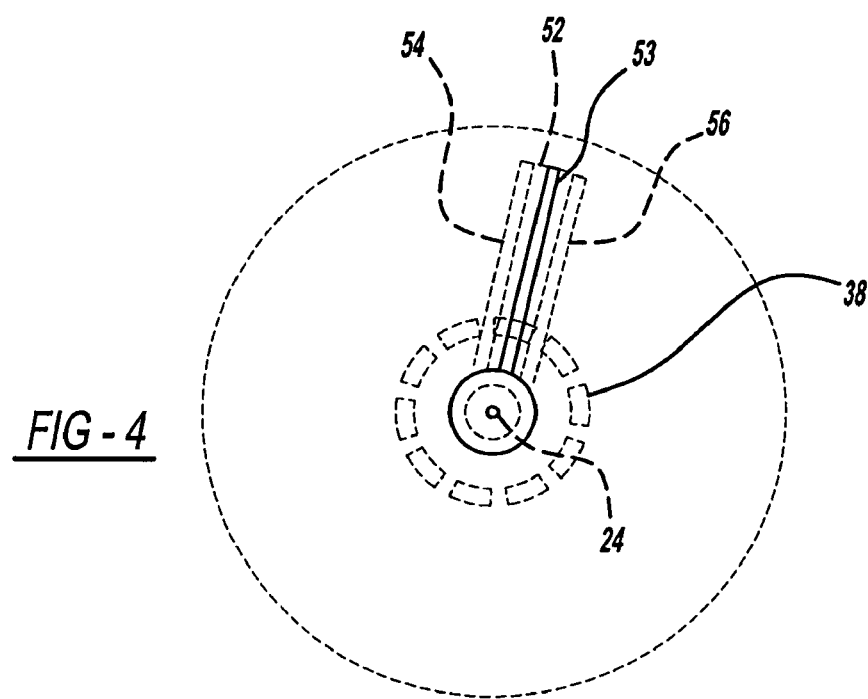
FIG. 4 is a top view of a gauge according to an embodiment of the teachings.
Figure 5:
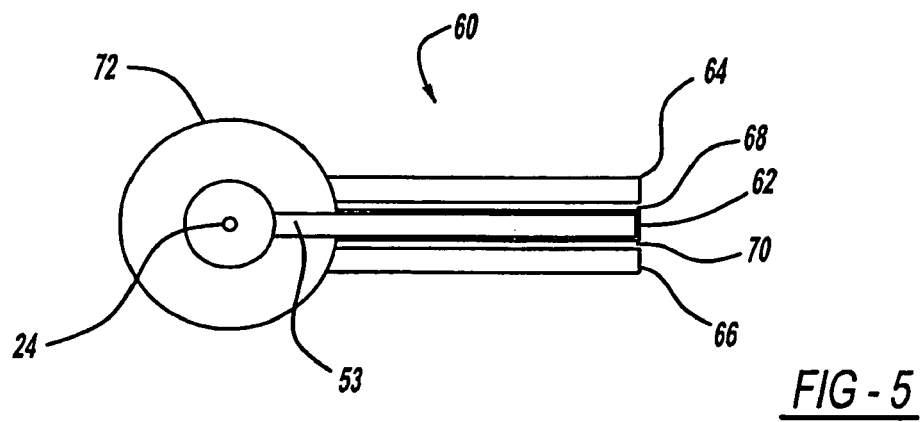
FIG. 5 is a top view depicting pointers according to the teachings.

Turning now to FIGS. 4 and 5, a top view of another example of the structure of the present teachings depicts an upper pointer 53 and a lower pointer 52, which may be wider than the upper pointer 53. More specifically, the lower pointer may have a center section 52, and further a first or left side section 54 and a second or right side section 56. Between the first side section 54 and the second side section 56 is a middle section, which lies under or lower than the upper pointer 53. In such a scenario, when the lower pointer 52 is wider than the upper pointer 53, a larger halo effect, than if the lower pointer 52 were not as wide, may be experienced by a viewer of the gauge 10. Additionally, the first side section 54 and the second side section 56 may be molded in a different color than the middle section of the lower pointer 52. Such a color scenario may make the make the upper pointer 53 stand out in color contrast and provide a more pleasing appearance to a viewer. As depicted in FIG. 4, the numerous LED 38 may be arranged in a ring around the shaft 24 so that a prism similar to the prism 36 depicted in FIG. 2, may receive light from the LED 38 and transmit it through the lower pointer 52.

Turning to FIG. 5, another embodiment of the present teachings is a lower pointer 60 that exhibits a series of prongs. The series of prongs, and spacing in between the prongs create a specific lighting effect and offer the advantages, as mentioned above, for a viewer. More specifically, the lower pointer 60 may have a middle prong 62, a first side prong 64, and a second side prong 66. Between the middle prong 62 and the first side prong 64, a gap 68 or space is defined, and similarly, between the middle prong 62 and the second side prong 66, another gap 70 or space is defined. The prongs 62, 64, 66 protrude from a hub 72, which is attached to the shaft 24. As in the embodiment depicted in FIG. 4, the lower pointer 60 lies under the upper pointer 53 such that the middle prong 62 lies directly under the upper pointer 53. More specifically, as the hub 72 turns on the shaft 24 when rotated by the motor 30, the middle prong 62 will remain below (such as depicted in FIG. 2) and directly under the upper pointer, such as the upper pointer 53 depicted in FIG. 4.

Continuing with reference to FIG. 5, the pointer 60 possesses specific advantages with its prongs 62, 64, 66 and spaces 68, 70 between the prongs. For instance, the prongs may be molded in one specific color such that the middle prong 62 of the lower pointer 60, together with the molded color of the upper pointer 53, may convey a blended color to a viewer while flanked with the molded color of the first side pointer 64 and second side pointer 66. Thus, when the gauge 10 is viewed, the pointer 53 will appear to the driver in a color different from the color on either side of the pointer 53. In another scenario the color of the lower pointer 60 and the upper pointer 53 may be the same which will result in the pointer 53 being of a higher light intensity than either of the first side prong 64 and second side prong 66, especially if a sole prism 36, as depicted in FIG. 2, is located directly under the middle prong 62 which will cause the middle prong 62 to receive more light than either of the side prongs 64, 66. Still yet, to convey or reflect different colors, the side prongs 64, 66 and or the middle prong 62 may be coated or covered with a mask, such as a colored foil, to transmit and reflect light in a specific color. With the prongs 62, 64, 66 each transmitting color, or at least a more intense and brighter light, the spaces 68, 70 defined between the prongs do not transmit light and thus such areas are seen as intensely by a viewer. The prongs 62, 64, 66 may each have their own prism, similar to that depicted in FIG. 2.

Figure 6:
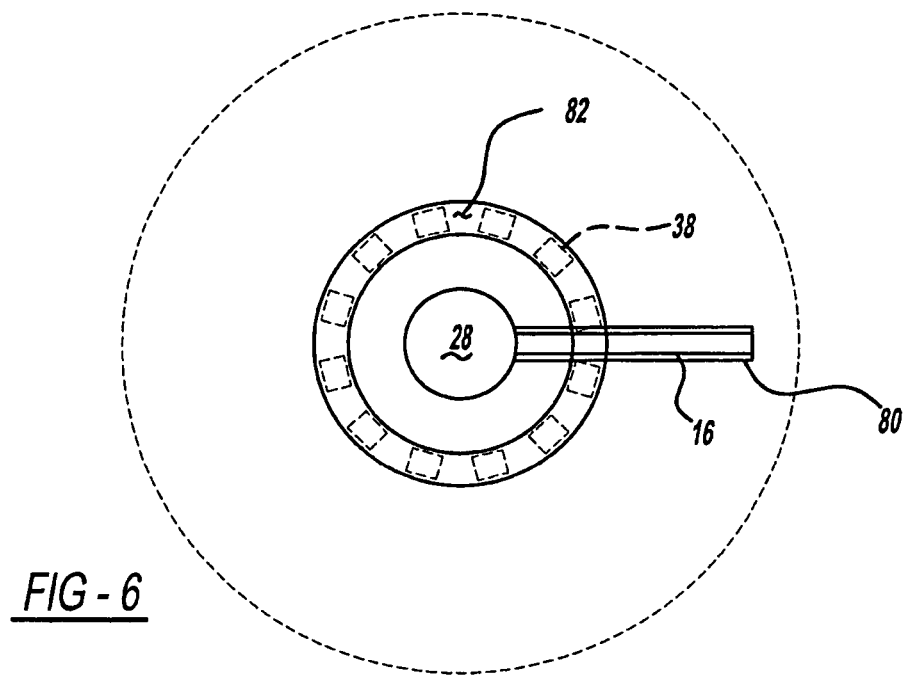
FIG. 6 is a top view of a gauge according to an embodiment of the teachings.
Figure 7:
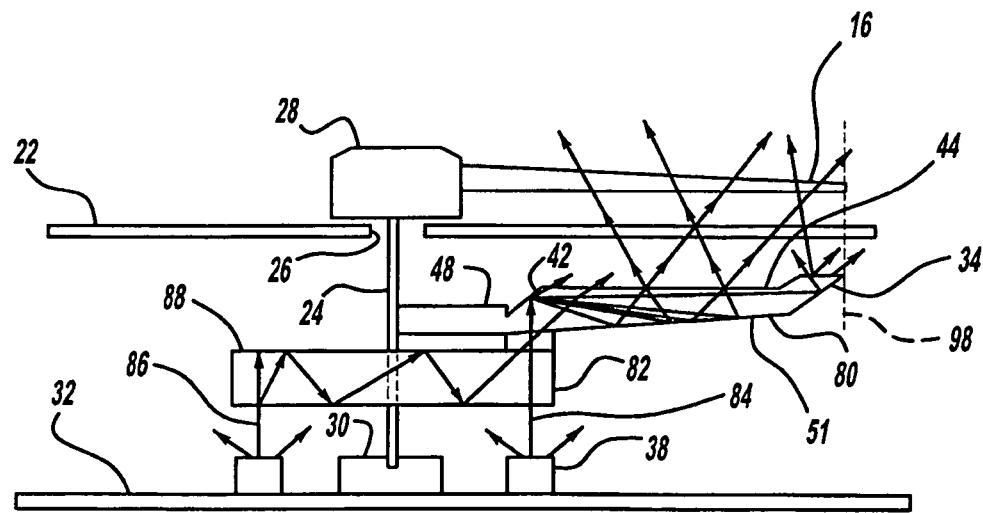
FIG. 7 is a side view of a gauge according to an embodiment of the teachings.

Turning now to FIGS. 6 and 7, another embodiment of the invention will be described. The upper pointer 16 depicted in FIG. 6 resides over a lower pointer 80. The lower pointer 80 may have an integral ring 82 to perform the function that the prism 36 of FIG. 2 performs, which is to receive and transmit light to the lower pointer 80. More specifically, the ring 82 may be a circular piece that is connected to the lower pointer 80. As depicted in FIG. 6, the circular ring 82 may lie over the LEDs 38 to receive light from the LEDs 38 regardless of the rotational position of the ring 82, an advantage of the embodiment.

The ring 82 may be integrally molded to the lower pointer 80 and the ring 82 may be formed from the same material as the lower pointer 80. To illustrate the employment of the ring 82, FIGS. 6 and 7 depict the ring 82 situated over the numerous LED 38. When the ring 82 is stationary or rotates, the ring 82 receives light from the LED 38, as depicted with light beam 84 and 86. The ring may be masked with a reflective material on its top surface 88 to encourage light to reflect through the ring and into the lower pointer 80. Similarly the bottom surface 51 of the lower pointer 80 may be masked with a reflective material to encourage and facilitate the transmission of light throughout the lower pointer 80 and from the upper surface 44 of the lower pointer 80 and into the dial plate 22 and upper pointer 16. An advantage of the ring 82 being integral with or attached to the lower pointer 80 is that light may gain access to the ring 82 by any LED 38 on the PCB and transferred into the lower pointer 80 for eventual direction to the face plate 22 and upper pointer 16. The lower pointer 80 and upper pointer 16 of FIG. 7 may extend from the pointer shaft 24 to the same extent or distance, as indicated by the plane 98.

Figure 8:
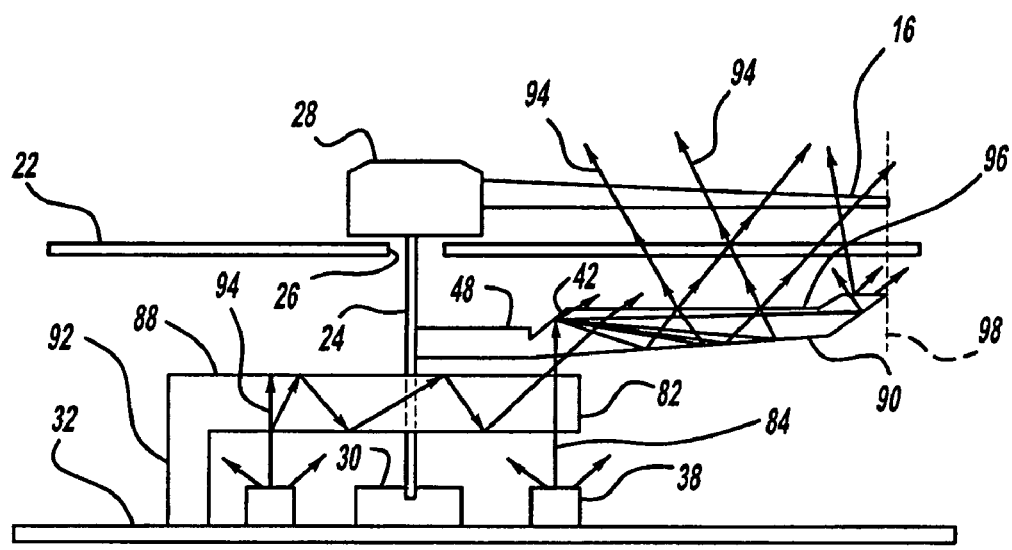
FIG. 8 is a side view of a gauge according to an embodiment of the teachings.

Turning now to FIG. 8, another variation of the teachings will be presented. More specifically, in FIG. 8, the ring 82 is not an integral or attached part of the lower pointer 90, and instead, the light ring 82 may be mounted to the printed circuit board 32 such as on a leg 92 or more than one leg. In such an arrangement, light beams 94 may pass from the light source, such as LED 38 and into the ring 82. The light beams 94 may pass through the ring 82 and out of the top surface 88 of the ring to reach the dial plate 22. Alternatively, the light may transmit through the ring 82, from the top surface 88 and into the lower pointer 90. The light beams 94 may then pass from the top surface 96 of the lower pointer 90, through the dial plate 22 and into to the upper pointer 16. Thus, the light beams 94 illuminate the indicia and graduations of the first scale 12 and second scale 14 more brightly in an area 46 (FIG. 1) than in the areas lying beyond the area 46. The more brightly illuminated area 46 presents an area more easily and more quickly seen by a viewer, especially during times when the sun is not shining. The lower pointer 90 and upper pointer 16 of FIG. 8 may extend from the pointer shaft 24 to the same extent or distance, as indicated by the plane 98.

The upper pointer 16 and the lower pointer 34 may be molded from a particular type of plastic, such as polycarbonate or an acrylic material, such as Polymethyl Methacrylate ("PMMA"). The pointers 16, 34 may be plated or masked with a material, such as a colored foil, to provide colored light to a viewer. The pointers 16, 34, 60, 80 may also remain transparent. The upper and lower pointers may also extend the same distance from the pointer shaft 24 such that the lower pointer may provide the lighted halo effect about the upper pointer.

As described above, a gauge 10 may be an assemblage of: a dial plate 22 through which a pointer shaft 24 may pass; an upper pointer 16 attached to the pointer shaft 24 and resident on a viewed side (relative to a human viewer) of the dial plate 22; a light source 38; and a lower pointer 34 attached to the pointer shaft 24 and resident on a non-viewed side of the dial plate 22 to receive light from the light source 38. The gauge 10 may further employ an attached or integrally molded light receiver 36 such that the light receiver 36 receives light and transfers it or directs it into the lower pointer 34. The light receiver 36 may form a ninety degree angle with the lower pointer. The lower pointer 34 may extend away from the pointer shaft 24 to at least the same length as the upper pointer 16. The lower pointer 34 may further employ a plurality of light carrying prongs 62, 64, 66 that may be separated by air gaps or space. The upper pointer 16 may receive light from the lower pointer 34. The upper pointer 16 may be located directly above the lower pointer 34 with respect to a viewer's line of sight. The lower pointer 34 may employ a light receiving and transmitting ring 82 for receiving and transmitting light into the lower pointer 80. The lower pointer 80 may be wider than or narrower than the upper pointer 16.

A gauge 10 may further be an assemblage of: a dial plate 22 through which a pointer shaft 24 passes; a printed circuit board 32 having a light source 38 and a motor 30 mounted to it such that the pointer shaft 24 may be driven by the motor 30. An upper pointer 16 may be attached to the pointer shaft 24 and located on a viewed side of the dial plate 22 while a lower pointer 34 may be attached to the pointer shaft 24 and be located on a non-viewed side of the dial plate 22. The lower pointer 34 may be positioned to receive light from the light source 38 with the lower pointer 34 positioned directly in line with the upper pointer 16 as viewed by a driver such that the lower pointer 34 is not itself visible and appears hidden (see FIG. 3). The gauge 10 may further employ a light-collecting prism 36 located on and protruding from a light source side of the lower pointer 53, the prism 36 having a rounded end adjacent the light source 38. The gauge 10 may further or alternatively employ a light-collecting ring 82 to collect light and transmit light into the lower pointer 80, the ring 82 may be located between the lower pointer 80 and the light source 38. The ring 82 may be attached to the lower pointer 80 and the upper pointer and lower pointer have tips that extend equidistance from the pointer shaft 24. The ring 82 may be attached to the printed circuit board 32.

A gauge 10 may employ: a dial plate 22 through which a pointer shaft 24 may pass such that a gap or space exists between the dial plate 22 and the shaft; a printed circuit board 32 which may have a plurality of light sources 38 and a motor 30 mounted to it. The pointer shaft 24 may be driven by the motor 30. An upper pointer 16 may be attached to the pointer shaft 24 and be located on a viewed side of the dial plate 24. A lower pointer may be attached to the pointer shaft 24 and be located on a non-viewed side of the dial plate 24. The lower pointer may be positioned to receive light from the light source 38 and additionally, the lower pointer may be positioned directly in line with the upper pointer 16 as viewed by a driver such that the lower pointer does not protrude beyond the boundary or perimeter of the upper pointer. The lower pointer and upper pointer may extend equidistantly from the pointer shaft 24. A light-collecting ring may collect light and transmit light into the lower pointer with the ring potentially being located between the lower pointer and the light source. The ring may be an integral part of the lower pointer. The ring may be attached to and cantilevered over the printed circuit board. The lower pointer may further be a structure with a plurality of prongs.

What is claimed is:

1. A gauge comprising:
   a dial plate through which a pointer shaft passes;
   a dial located on the dial plate;
   an upper pointer attached to the pointer shaft and resident on a viewed side of the dial plate;
   a light source; and
   a lower pointer attached to the pointer shaft and resident on a non-viewed side of the dial plate to receive light from the light source, the lower pointer having a top surface located under the upper pointer and the dial, wherein light emitted from the to surface illuminates the upper pointer and the dial.

2. The gauge of claim 1, further comprising:
   a light receiver, wherein the light receiver receives light and transfers the light into the lower pointer.

3. The gauge of claim 2, wherein the light receiver forms a ninety degree angle with the lower pointer.

4. The gauge of claim 1, wherein the lower pointer extends to at least the same length as the upper pointer.

5. The gauge of claim 1, the lower pointer further comprising a plurality of light carrying prongs.

6. The gauge of claim 5, wherein the plurality of light carrying prongs are separated by a gap.

7. The gauge of claim 1, wherein the upper pointer receives light from the lower pointer.

8. The gauge of claim 1, wherein the upper pointer is located directly above the lower pointer with respect to a viewer's line of sight.

9. The gauge of claim 1, wherein the lower pointer has a light receiving and transmitting ring for receiving and transmitting light into the lower pointer.

10. The gauge of claim 1, wherein the lower pointer is wider than the upper pointer.

11. A gauge comprising:
a dial plate through which a pointer shaft passes;
a dial located on the dial plate;
a printed circuit board;
a light source and a motor mounted to the printed circuit board, the pointer shaft being driven by the motor;
an upper pointer attached to the pointer shaft and located on a viewed side of the dial plate; and
a lower pointer attached to the pointer shaft and located on a non-viewed side of the dial plate, the lower pointer positioned to receive light from the light source and the lower pointer positioned directly in line with the upper pointer as viewed by a driver, the lower pointer having a top surface located under the upper pointer and the dial, wherein light emitted from the to surface illuminates the upper pointer and the dial.

12. The gauge of claim 11, further comprising:
a light-collecting prism located on and protruding from a light source side of the lower pointer, the prism having a rounded end adjacent the light source.

13. The gauge of claim 11, further comprising:
a light-collecting ring to collect light and transmit light into the lower pointer, the ring located between the lower pointer and the light source.

14. The gauge of claim 13, wherein the ring is attached to the lower pointer.

15. The gauge of claim 13, wherein the ring is attached to the lower pointer, and wherein the upper pointer has an upper pointer tip and the lower pointer has a lower pointer tip, wherein the upper pointer tip and the lower pointer tip project to an equal distance from the pointer shaft.

16. The gauge of claim 13, wherein the ring is attached to the printed circuit board.

17. A gauge comprising:
a dial plate through which a pointer shaft passes;
a dial located on the dial plate;
a printed circuit board;
a plurality of light sources and a motor mounted to the printed circuit board, the pointer shaft being driven by the motor;
an upper pointer attached to the pointer shaft and located on a viewed side of the dial plate;
a lower pointer attached to the pointer shaft and located on a non-viewed side of the dial plate, the lower pointer positioned to receive light from the light source and the lower pointer positioned directly in line with the upper pointer as viewed by a driver, the lower pointer has a lower pointer tip and the upper pointer has an upper pointer tip, wherein the lower pointer tip and the upper pointer tip project to an equal distance from the pointer shaft; and
a light-collecting ring to collect light and transmit light into the lower pointer, the ring located between the lower pointer and the light source, the lower pointer having a to surface located under the upper pointer and the dial, wherein light emitted from the to surface illuminates the upper pointer and the dial.

18. The gauge of claim 17, wherein the ring is an integral part of the lower pointer.

19. The gauge of claim 17, wherein the ring is attached to and cantilevered over the printed circuit board.

20. The gauge of claim 17, wherein the lower pointer further comprises a plurality of prongs.

* * * * *

UNITED STATES PATENT AND TRADEMARK OFFICE
CERTIFICATE OF CORRECTION

| | | |
|---|---|---|
| PATENT NO. | : 7,810,445 B2 | Page 1 of 1 |
| APPLICATION NO. | : 12/237458 | |
| DATED | : October 12, 2010 | |
| INVENTOR(S) | : Jagadeesh Krishnamurthy | |

It is certified that error appears in the above-identified patent and that said Letters Patent is hereby corrected as shown below:

Col. 2, line 42, "of" should be -- or --

Col. 3, line 4, after "the" insert -- shaft 24 --

Col. 3, line 6, delete 1$^{st}$ occurrence of "the"

Col. 3, line 16, "them" should -- then --

Col. 3, line 64, delete 2$^{nd}$ occurrence of "make the"

Col. 4, line 44, after "are" insert -- not --

Col. 7, line 25, claim 11, "to" should be -- top --

Col. 8, line 27, claim 17, "to" should be -- top --

Col. 8, line 29, claim 17, "to" should be -- top --

Signed and Sealed this

Eighth Day of February, 2011

David J. Kappos
*Director of the United States Patent and Trademark Office*